United States Patent [19]

Walter

[11] Patent Number: 4,839,974
[45] Date of Patent: Jun. 20, 1989

[54] CLOSED DECORATION FRAME

[75] Inventor: Eckhard Walter, Braunschweig, Fed. Rep. of Germany

[73] Assignee: Rahmen mit System GmbH, Braunschweig, Fed. Rep. of Germany

[21] Appl. No.: 2,629

[22] PCT Filed: Mar. 22, 1986

[86] PCT No.: PCT/EP86/00172
§ 371 Date: Dec. 1, 1986
§ 102(e) Date: Dec. 1, 1986

[87] PCT Pub. No.: WO86/05668
PCT Pub. Date: Oct. 9, 1986

[30] Foreign Application Priority Data

Mar. 29, 1985 [DE] Fed. Rep. of Germany ... 8509511[U]

[51] Int. Cl.⁴ ............................................... G09F 1/12
[52] U.S. Cl. ..................................... 40/152; 40/152.1; 40/155; 403/402
[58] Field of Search ............... 40/152, 152.1, 10, 154, 40/642

[56] References Cited

U.S. PATENT DOCUMENTS

| 3,965,601 | 6/1976 | Nielsen | 40/155 |
| 4,124,322 | 11/1978 | Parisien | 40/152 |
| 4,136,470 | 1/1979 | Barz | 40/152 |
| 4,368,584 | 1/1983 | Logan | 40/152 |
| 4,477,990 | 10/1984 | Buchanan | 40/152 |
| 4,516,341 | 5/1985 | Jenkins | 40/152 |

FOREIGN PATENT DOCUMENTS

| 0068885 | 1/1983 | European Pat. Off. . |
| 2331308 | 10/1977 | France . |
| 8302146 | 6/1983 | Netherlands . |
| WO84/04366 | 11/1984 | PCT Int'l Appl. . |
| 1290579 | 4/1971 | United Kingdom . |

Primary Examiner—Gene Mancene
Assistant Examiner—Wenceslao J. Contreras
Attorney, Agent, or Firm—Foley & Lardner, Schwartz, Jeffery, Schwaab, Mack, Blumenthal & Evans

[57] ABSTRACT

A closed frame is formed of a series of longitudinal pieces and a series of interlocking corner elements acting to hold the frame in assembled relation.

22 Claims, 4 Drawing Sheets

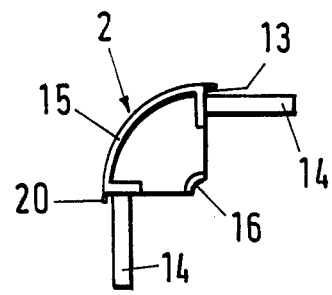
Fig.4
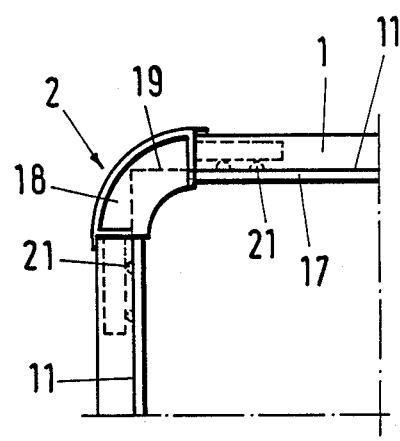
Fig.5
Fig.6
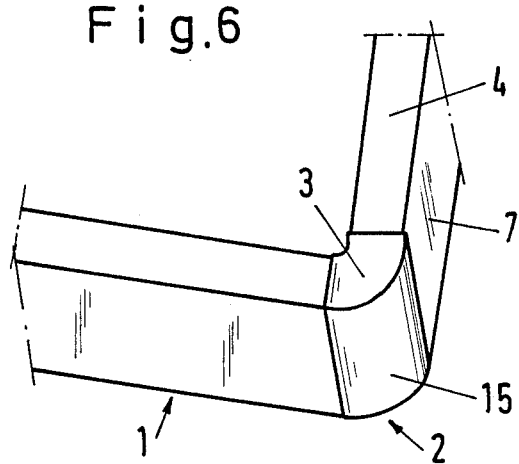

CLOSED DECORATION FRAME

The invention relates to a closed decoration frame composed of sectional pieces which are connected to one another and are provided with a hollow chamber and which, in use, form visibly from outside an end face and a continuous outer wall and invisibly a back and an inner wall, the end face projecting beyond the inner wall toward the inside of the frame and forming a bearing edge for sheet-like contents of the decoration frame.

Decoration frames of this type are primarily used as picture frames, but also serve to hold mirrors or the like. Conventionally, the sectional pieces for rectangular frames are mitered in the corner region and connected to one another there, for example by gluing. This results in strictly rectangular frames which only have a pleasing appearance when the miter cut has been made extremely carefully. It is therefore not possible to vary the design of the frames in the corner region.

Object of the invention therefore, is to provide a closed decoration frame of the type mentioned in the introduction, in which the shape in the corner regions of the frame can be varied.

According to the invention, this object is achieved in that the sectional pieces are each connected by means of a corner part, in that essentially continues the outer walls and the end faces of the sectional pieces in the corner region and by means of a lug projects into the respective hollow chamber in each of the two sectional pieces and is connected to these there.

In the frame according to the invention, the sectional pieces do not butt directly against one another, but are connected to one another by the corner parts. Where a rectangular frame is concerned, the corner parts have two lugs which are at right angles to one another and which project into the hollow chambers of the sectional parts and are connected to the sectional parts there, for example by gluing or by deformation of the sectional parts. The invention makes it possible to design the frame with normal corners, but also to provide corners with rounded contours.

In a preferred embodiment, the outer edge of the end face of the corner parts is therefore rounded, and preferably the inner edge of the end faces of the corner parts is also rounded. This makes it possible, for the first time, to design a closed decoration frame in a stable manner so as to provide rounded corners which in a simple way connect the sectional parts to one another.

When the corners are also rounded on the inner edge, it is advantageous if the corner parts are designed without an inner wall continuing the inner walls of the sectional pieces and form a receiving space which is free in the extension of the inner walls of the two sectional parts up to the point of intersection of this extension. Although the inner edge of the end face is rounded, pictures, mirrors or the like with rectangular edges can be placed in this frame, since the corner parts have a corresponding receiving space. The decoration frame with rounded corners therefore requires no machining of the generally rectangular pictures, mirrors or the like, which machining may be very costly.

The corner parts according to the invention make it possible to use sectional pieces which are cut off at right angles and which consequently do not have to be miter-cut in a relatively expensive way.

In an especially simple embodiment, the sectional pieces are connected to the lugs of the corner parts by deforming the hollow chambers on the inner wall into the inserted lugs. After the corner parts have been inserted into the hollow chambers, therefore, the invisible inner wall of the hollow chambers is merely deformed at particular points, the deformation consequently pressing into the lug of the corner part and making a firm connection. For this purpose, the corner parts are preferably made of plastic. Alternatively, screws can be screwed into the lugs of the corner parts and serve to connect the corner parts firmly to the sectional pieces.

The decoration frame according to the invention can be produced in a highly advantageous way from aluminum sectional parts. The corner parts are preferably made of plastic and have the same surface layer on the outwardly visible faces of the frame as the sectional pieces. This gives the impression of a uniform frame.

Preferably, the width of the end faces of the corner parts is somewhat greater than the width of the end faces of the sectional pieces. The corner parts can then have a small lug which covers the butt joint between the sectional piece and the corner part at least in the region of the end face and of the visible outer wall.

The innovation will be explained in detail below with reference to an exemplary embodiment illustrated in the drawing. In the drawing.

Figure 3:
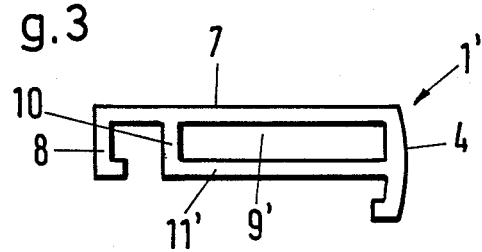
Figure 7A:
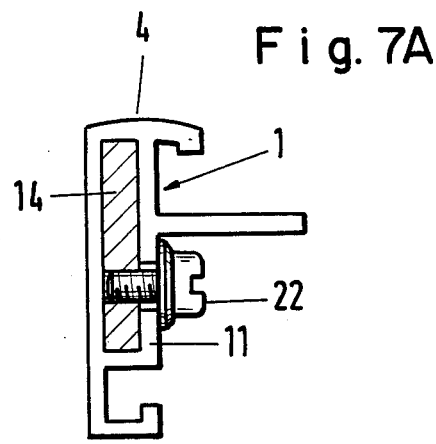
Figure 7B:
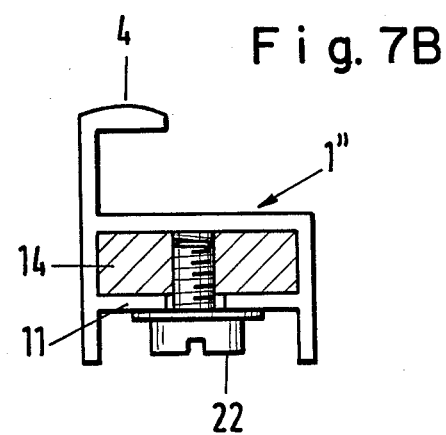

FIG. 3 shows a section through an alternatively designed sectional piece of the frame, FIG. 4 shows a rear view of a corner part, FIG. 5 shows a rear view of a corner part with the associated sectional pieces, FIG. 6 shows a perspective view of the end face and outer wall of a corner connection formed by two sectional pieces and a corner part, FIGS. 7A and 7B show two examples of the fixing of the lugs of corner parts by means of a fixing screw, and FIG. 8 shows three alternative shapes for corner parts.

Figure 1:
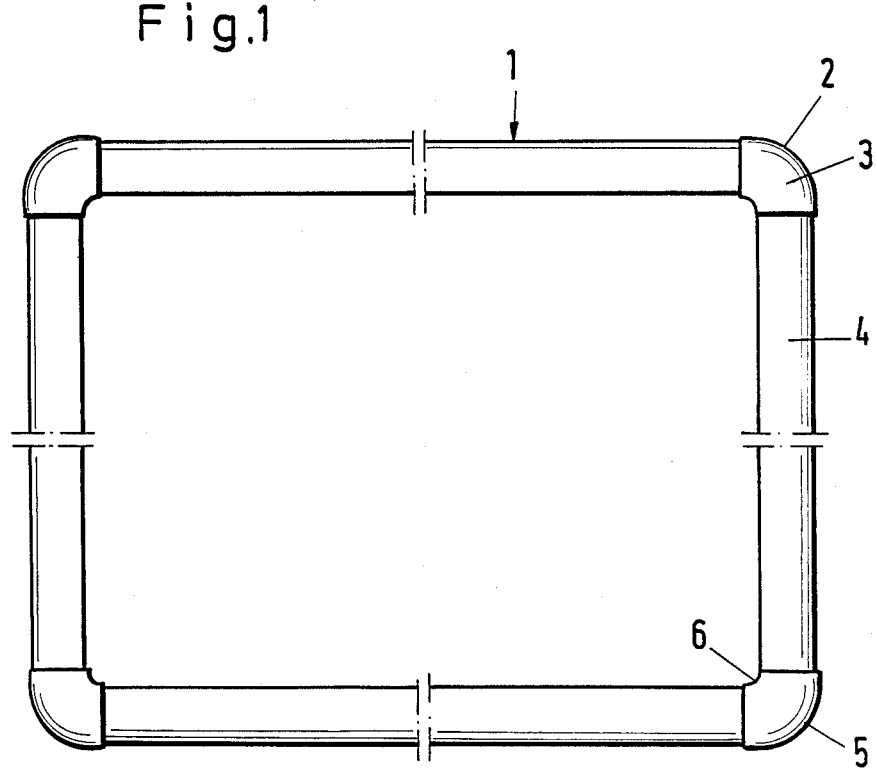
FIG. 1 shows a view of a closed decoration frame.

The frame illustrated in FIG. 1 comprises four sectional pieces 1 which are connected by means of four corner parts 2 to form a closed, rectangular frame. The corner parts 2 each have an end face 3, which essentially continue end faces 4 of the sectional pieces 1.

The end faces of the corner parts 2 have a rounded outer edge 5 and a rounded inner edge 6.

Figure 2:
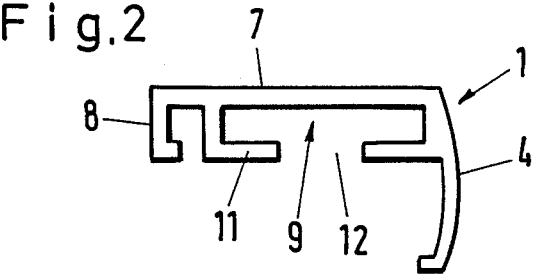
FIG. 2 show a section through a sectional piece of the frame.

FIGS. 2 and 3 each show a cross-section through the structure of the sectional pieces in two embodiments 1, 1'. Both sectional pieces 1, 1' have a somewhat curved end face 4 which an outer wall 7 adjoins on one side. The outer wall 7 is closed off at its free end by an inward facing wall piece 8. The rear wall piece 8 of the sections 1, 1' extends approximately over half the width of the end face 4. A hollow chamber 9, 9' directly adjacent to the end face 4 also extends over this depth and is limited, parallel to the end face 4, by a wall piece 10 extending parallel to the rear wall piece and by a wall piece 11, 11' extending parallel to the outer wall 7. Whereas the wall piece 11 is interrupted by a longitudinal orifice 12, thus providing the hollow chamber 9 with the orifice 12, the wall piece 11' is designed without any interruption, so that the hollow chamber 9' is closed.

The sectional pieces 1 are cut off at right angles and butt with their cut face against a stop face 13 of the corner part 2. A corresponding stop face 13 is provided at an angle of 90°. Lugs 14 extend outwards from the two stops faces 13 of the corner part 2 and are therefore at right angles to one another. The lugs 14 are rectangular and matched in shape to the shape of the hollow chamber 9.

The stop face 13 is located on an appropriately positioned wall web which can be seen in FIG. 4. The view from the rear-wall side of the frame also shows a curved outer wall 15 and a curved inner edge 16 of the corner part 2. Whereas the outer wall 15 extends over the depth of the corner part 2, the inner edge 16 is formed merely by a narrow rib which is not continued into an inner wall.

FIG. 5 shows this. It illustrates the corner part 2 with two sectional pieces 1 pushed onto it. The end faces 4 project inwards beyond the inner walls 11 of the sectional parts 1 and with the projecting part form a bearing frame 17. This in general holds a glass pane inserted from the rear, a mirror, a poster or the like. The lack of an inner wall on the corner part 2 offers the advantage that the corner part 2 forms a free receiving space 18 in the extension 19 (represented by broken lines) of the inner walls 11 of the sectional pieces 1 up to the point of intersection of the extensions 19. The free receiving space of the rounded corner parts 2 can therefore receive glass panes, mirror plates, pictures, etc. which have right-angled corners, that is to say their corners do not have to be rounded off.

FIGS. 4 and 5 show, in the extension of the outer wall 15, small cover pieces 20 which cover the butt joint of the sectional pieces 1 at the stop face 13. Corresponding cover pieces are also provided for the end face 4 of the sectional pieces 1.

The perspective representation in FIG. 6 shows the outer wall 7 and end face 4 of the sectional pieces 1 and also the outer wall 15 and end face 3 of the corner parts 2.

The sectional pieces 1 can be connected to the lugs 14 of the corner parts 2 in a simple way by means of deformations 21 (FIG. 5) at particular points in the form of indentations of the inner walls 11 into the lugs 14. This avoids the need for more expensive connecting measures.

FIGS. 7A and 7B shows the fixing of lugs 14 of corner pieces 2 to sectional pieces 1 and 1''. The fixing is effected by means of a fixing screw 22 which is screwed into a threaded bore in the lug 14. The screw projects through the orifice 12, described with reference to FIG. 2, in the inner wall 11 and presses with its screw head against the inner wall 11, with the result that the lug 14 is pulled against the inner wall 11 from the other side and retained by means of frictional connection.

FIG. 8 illustrates three further embodiments for corner parts 2'', 2''', and 2'''', each in a plan view and in a perspective representation. FIG. 8a shows a corner part 2' of conventional angular design.

Figure 8A:
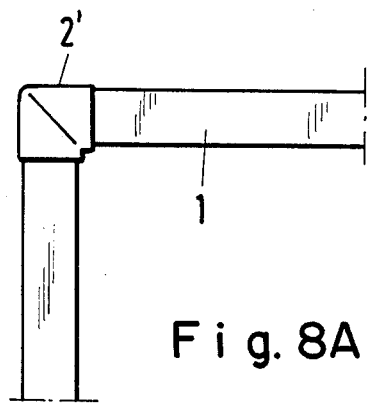
Figure 8B:
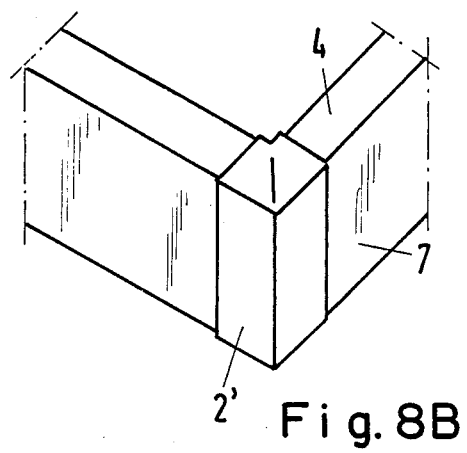

The corner part 2'' shown in FIG. 8b is designed as a polygon over the angle of 90°, so that a corner part 2'' subdivided in the manner of facets is formed.

Figure 8C:
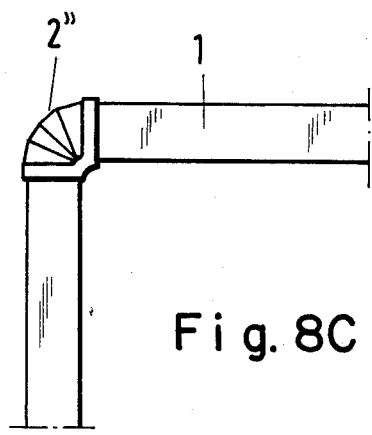
Figure 8D:
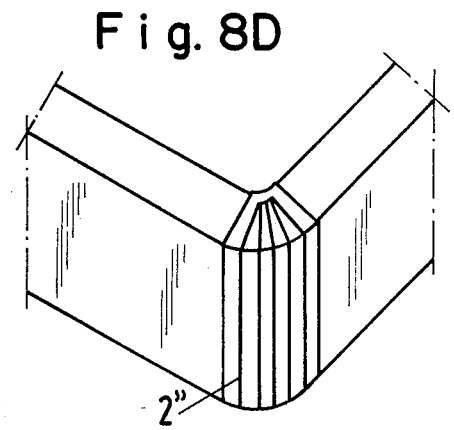
Figure 8E:
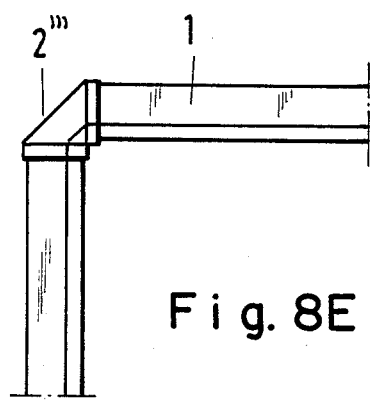
Figure 8F:
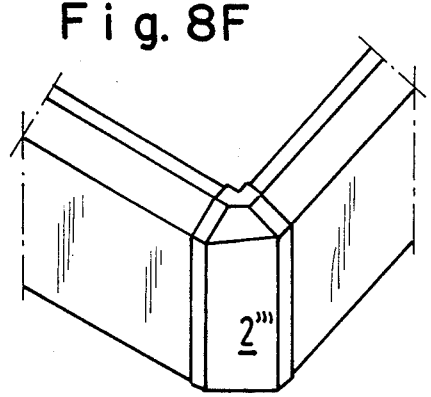

The corner part 2''' shown in FIG. 8c results in a prism-like design of the corner, since the stop faces arranged at an angle of 90° relative to one another are connected to one another by means of a straight outer edge.

In all three embodiments of the corner parts 2', 2'' and 2''' in FIG. 8, the butting edges between the corner parts 2', 2'' and 2''' on the one hand and the sectional pieces 1 on the other hand are covered on the end face 4 and the outer edges 7 by means of cover pieces 20 (see FIG. 4) attached to the corner parts.

It goes without saying that plastic sectional parts can also be used for the decoration frame according to the invention. The corner parts do not have to be produced from plastic but can, for example, also be composed of cast metal. While it is possible to design the frame with the sectional parts and the corner parts having a uniform appearance, it may be desirable to make the corner parts and structural parts in different colors, in order to make use of a special design possibility of the decoration frame according to the invention.

I claim:

1. A frame for retaining a generally planar member such as a picture, a mirror or the like, comprising:
    a polygonal frame comprised of a plurality of sectional pieces, each sectional piece comprising:
    an outer wall extending along a longitudinal axis and having an inner and outer surface,
    a wall piece connected to the inner surface of the outer wall and projecting inwardly,
    an inner wall spaced inwardly from the outer wall and connected to the wall piece,
    an end face connected to the outer wall and projecting inwardly with respect to the outer wall, the end face being adapted to contact the member when the member is inserted against the sectional piece,
    the outer wall, the wall piece, the inner wall and the end face defining a chamber; and
    a plurality of corner parts for connecting the sectional pieces together, each corner part comprising:
    an outer wall,
    a pair of inwardly projecting stop faces connected to the outer wall and oriented so as to be substantially perpendicular to one another.
    a pair of lugs, each lug extending from a respective stop face and being dimensioned so as to be receivable in the chamber of a sectional piece, whereby the sectional piece can be selectively secured to the corner part, the lugs being positioned with respect to the stop faces so that a pair of sectional pieces inserted over the lugs will be oriented substantially perpendicular to one another, each corner part further comprising a pair of inner edges disposed inwardly from the outer wall and spaced apart from one another in a lateral direction perpendicular to the longitudinal axis, the outer wall, the stop faces and the inner edges defining a free receiving space for receiving a portion of the generally planar member retained by the frame.

2. A frame as claimed in claim 1, wherein longitudinal ends of each sectional piece are disposed in a plane perpendicular to the longitudinal axis.

3. A frame as claimed in claim 1, wherein the outer wall of each corner piece is rounded.

4. A frame as claimed in claim 3, wherein the pair of inner edges of each corner part are rounded.

5. A frame as claimed in claim 1, wherein the surface of the inner wall of each sectional piece which faces outward is provided with deformations for engaging an inserted lug.

6. A frame as claimed in claim 1, wherein each corner part comprises plastic.

7. A frame as claimed in claim 1, wherein each sectional piece and each corner part is provided with an identical surface layer.

8. A frame as claimed in claim 1, wherein each corner part further comprises a cover piece.

9. A frame as claimed in claim 1, wherein one sectional piece further comprises a screw for engaging an inserted lug.

10. A frame as claimed in claim 1, wherein the end face of each sectional piece projects inwardly beyond the inner wall.

11. A frame as claimed in claim 1, wherein each sectional piece further comprises an orifice for receiving a screw.

12. A frame for retaining a generally planar member such as a picture, a mirror or the like, comprising:
   a polygonal frame comprised of a plurality of sectional pieces, each sectional piece comprising:
   an outer wall extending along a longitudinal axis and having an inner and outer surface,
   a wall piece connected to the inner surface of the outer wall and projecting inwardly,
   an inner wall spaced inwardly from the outer wall and connected to the wall piece,
   an end face connected to the outer wall and projecting inwardly with respect to the outer wall, the end face being adapted to contact the member when the member is inserted against the sectional piece,
   the outer wall, the wall piece, the inner wall and the end face defining a chamber; and
   a plurality of corner parts for connecting the sectional pieces together, each corner part comprising:
   an outer wall,
   a pair of inwardly projecting stop faces connected to the outer wall and oriented so as to be substantially perpendicular to one another,
   a pair of lugs, each lug extending from a respective stop face and being dimensioned so as to be receivable in the chamber of a sectional piece, whereby the sectional piece can be selectively secured to the corner part, the lugs being positioned with respect to the stop faces so that a pair of sectional pieces inserted over the lugs will be oriented substantially perpendicular to one another,
   said sectional pieces and said corner parts are respectively butt-jointed when connected so as to not overlap each other.

13. A frame as claimed in claim 12, wherein longitudinal ends of each sectional piece are disposed in a plane perpendicular to the longitudinal axis.

14. A frame as claimed in claim 12, wherein the outer wall of each corner piece is rounded.

15. A frame as claimed in claim 12, wherein the surface of the inner wall of each sectional piece which faces outward is provided with deformations for engaging an inserted lug.

16. A frame as claimed in claim 12, wherein each corner part comprises plastic.

17. A frame as claimed in claim 12, wherein each sectional piece and each corner part is provided with an identical surface layer.

18. A frame as claimed in claim 12, wherein each corner part further comprises a cover piece.

19. A frame as claimed in claim 12, wherein each sectional piece further comprises a screw for engaging an inserted lug.

20. A frame as claimed in claim 12, wherein the end face of each sectional piece projects inwardly beyond the inner wall.

21. A frame as claimed in claim 12, wherein each sectional piece further comprises an orifice for receiving a screw.

22. A frame as claimed in claim 12, wherein the outer wall of each corner part extends to include cover pieces for covering the butt joint of said sectional pieces and cover parts.

* * * * *